H. TRUST.
VEGETABLE PEELER.
APPLICATION FILED JAN. 9, 1913.
1,062,935.
Patented May 27, 1913.
3 SHEETS—SHEET 3.
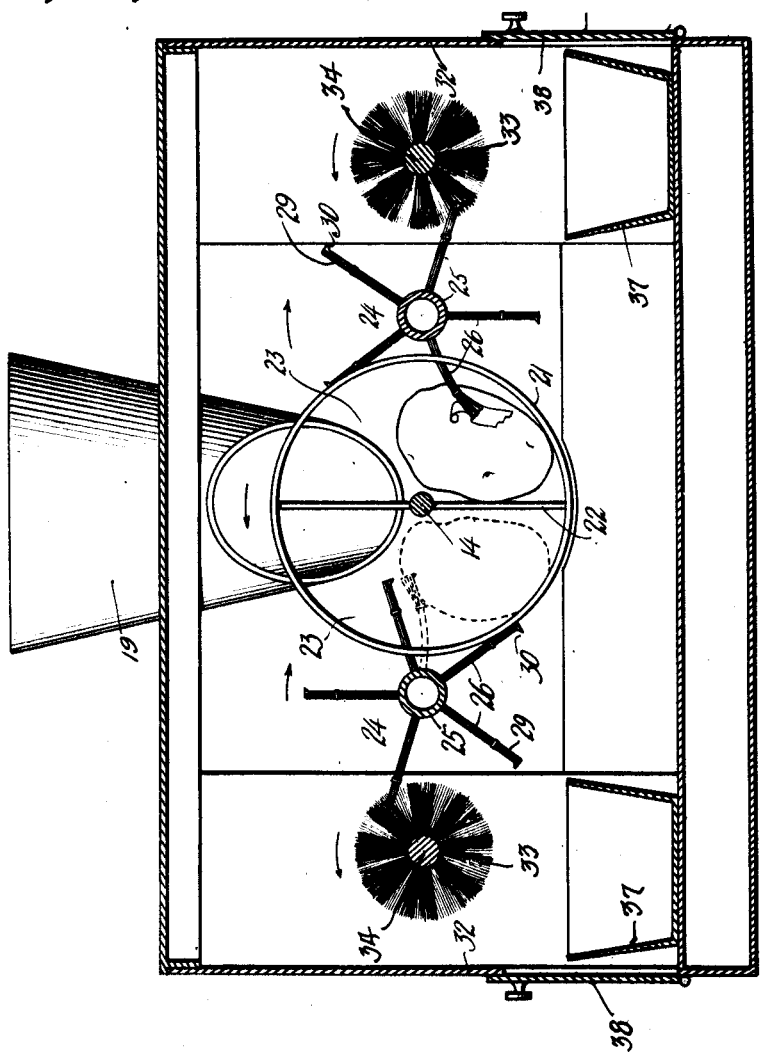
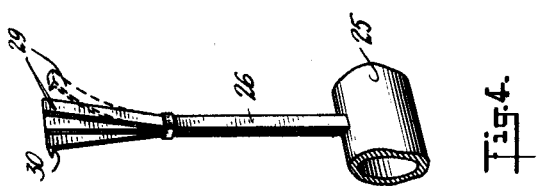
WITNESSES
INVENTOR
Henry Trust
BY
ATTORNEYS

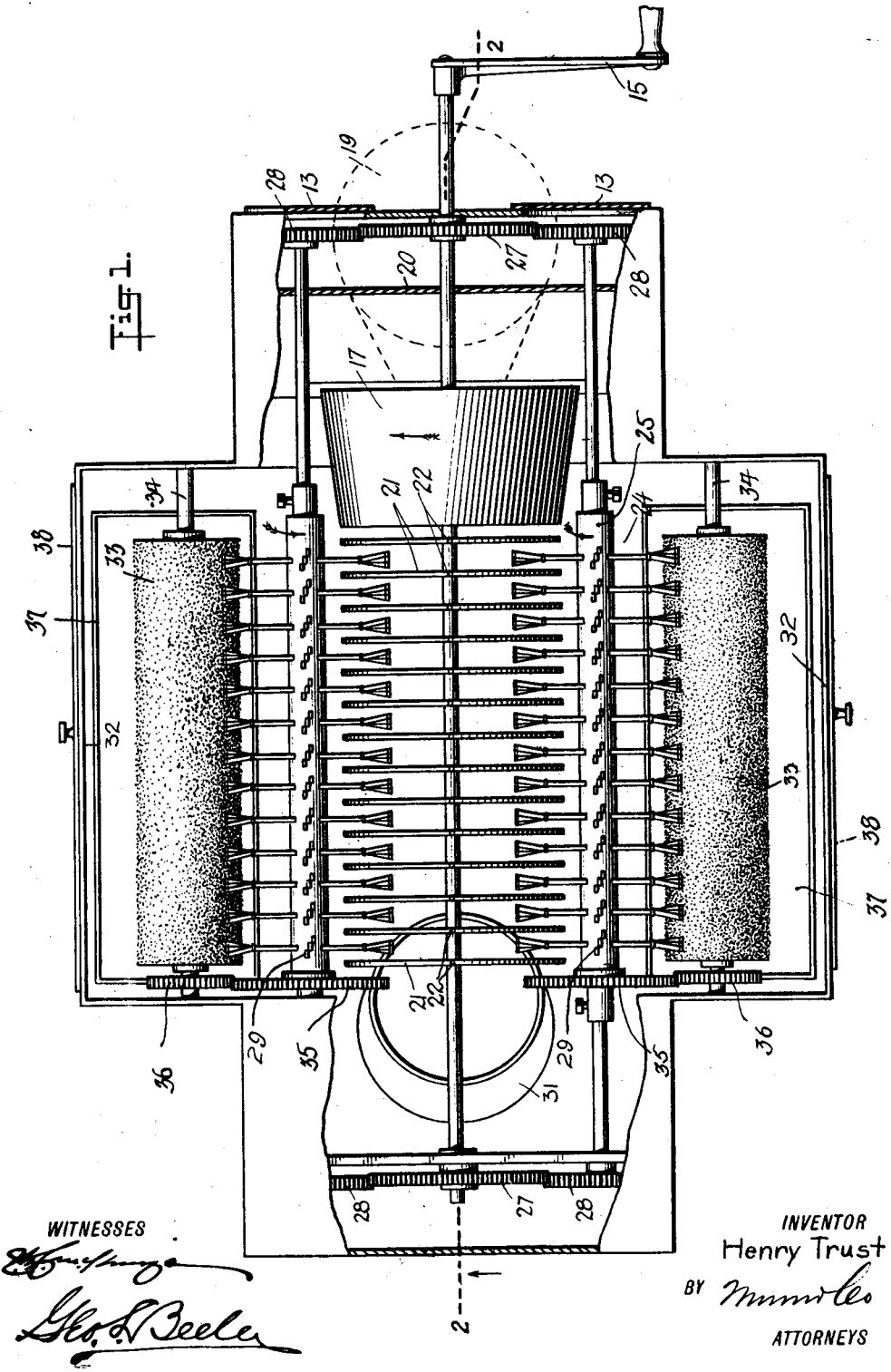

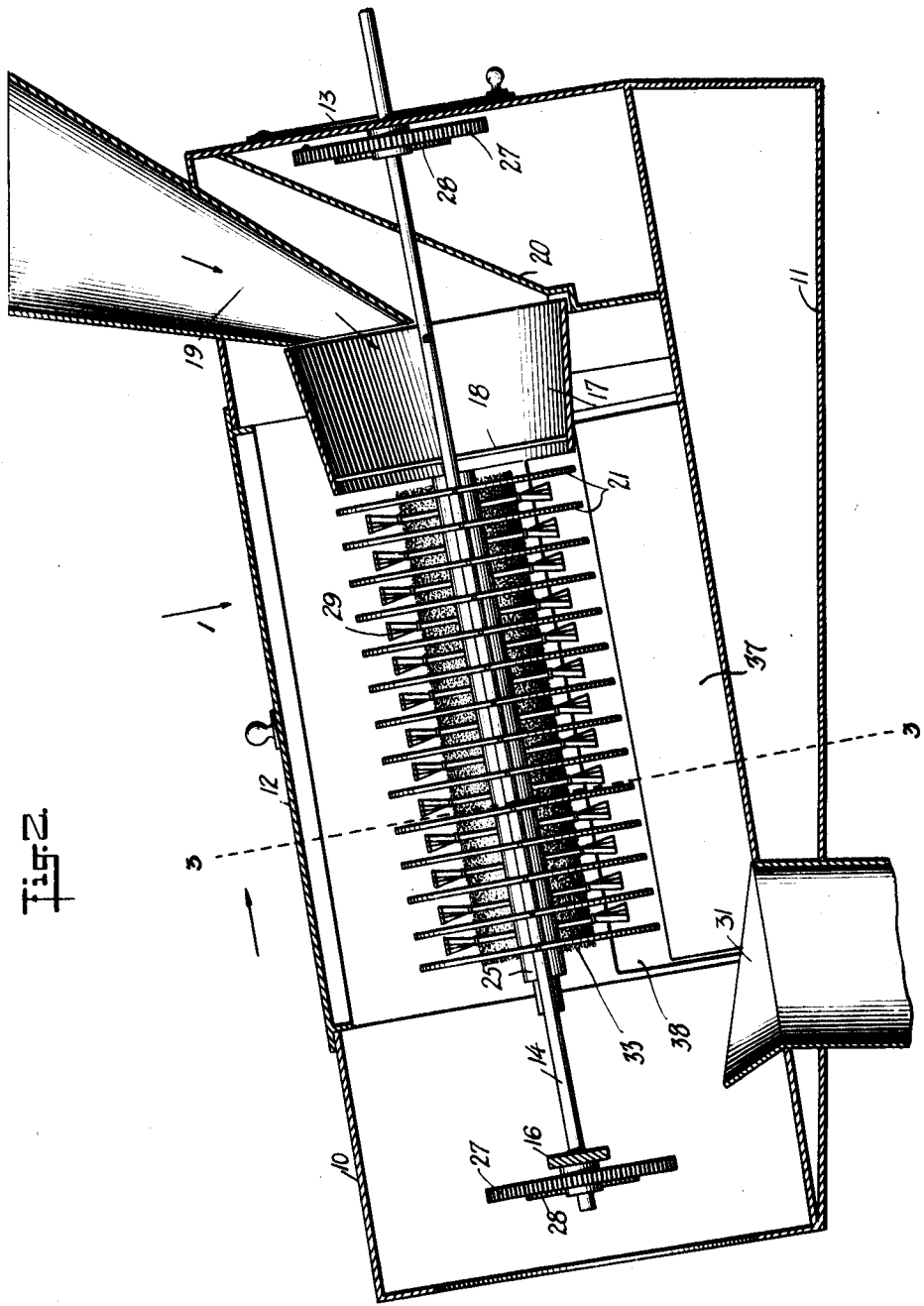

UNITED STATES PATENT OFFICE.

HENRY TRUST, OF NEW YORK, N. Y.

VEGETABLE-PEELER.

1,062,935.   Specification of Letters Patent.   Patented May 27, 1913.

Application filed January 9, 1913. Serial No. 740,977.

*To all whom it may concern:*

Be it known that I, HENRY TRUST, a citizen of the United States, and a resident of the city of New York, borough of Manhattan, in the county and State of New York, have invented a new and Improved Vegetable-Peeler, of which the following is a full, clear, and exact description.

This invention relates to machines for treating vegetables and has particular reference to mechanisms for peeling potatoes, apples, onions or other food products.

Among the objects of this invention is to produce a machine which, in a simple and reliable manner, will remove the skins from vegetables without damaging or destroying the main portion thereof.

A further object of this invention is to improve the details of construction whereby the operator has a better control of the means for feeding or delivering potatoes to the machine.

A still further object of this invention is to construct a machine of the character set forth in which the strippers are of peculiar and highly efficient character.

The foregoing and other objects of this invention will hereinafter be more fully described and claimed and illustrated in the drawings accompanying this specification in which like characters of reference indicate corresponding parts in all the views, and in which—

Figure 1 is a top view of the device with the cover removed, the ends of the casing being in section and the peeling mechanism proper being shown as viewed in the direction of the arrow 1 on Fig. 2; Fig. 2 is a longitudinal section on the line 2—2 of Fig. 1; Fig. 3 is a transverse section substantially on the line 3—3 of Fig. 2; and Fig. 4 is a detail of one of the stripper arms.

The several parts of this device may be made of any suitable materials and the relative sizes and proportions thereof, as well as the general design of the machine, may be varied to a considerable extent, depending upon the nature of the work to be done, without departing from the spirit of the invention. I wish it to be understood also that while for convenience of description I refer herein to potatoes, such term is to be interpreted in a generic, not a limiting, sense. While the construction herein set forth is adapted especially for removing the peelings from boiled potatoes, it is to be understood that with very little, if any, modification of the construction, it will be adapted for peeling raw potatoes or other forms of vegetables.

At 10 is indicated a frame or casing of any suitable nature supported upon a base 11. The casing 10, except as hereinafter set forth, is substantially closed, and therefore incloses the main operating portions of the mechanism. A cover 12 at the upper portion of the casing is removable for the purpose of affording access to the stripping mechanism. At the front end are arranged one or more hinged plates 13 for the purpose of affording access to the gearing.

Journaled in any suitable manner longitudinally of the casing and at a suitable inclination is a feeder shaft 14. Upon the front end of said shaft is an operating crank 15 which may represent one suitable form of means for operating the machine. The rear end of the shaft is journaled preferably within the casing on a cross bar 16. The feeder mechanism associated with said shaft 14 comprises a tumbler 17 of open-ended frusto-conical form and secured concentrically upon the shaft 14 by means of a plurality of bars 18 extending preferably at right angles to the shaft. The lower portion or effective bottom of the tumbler is inclined downwardly toward the rear of the machine, but because of the tapered nature of the tumbler, such inclination is less than that of the shaft to which it is connected. This fact, together with the presence of the bars 18, insures a proper delivery of the potatoes to the stripping mechanism. The potatoes are delivered to the tumbler through a hopper 19 carried by the casing and having its lower end opposite the receiving end of the tumbler. The potatoes are prevented from escaping from the tumbler by coöperation therewith of a guard 20 which serves also as a brace for the casing.

A further feature of the feeding mechanism consists of a series of guiding devices comprising a plurality of rings 21 preferably of equal diameter and equally spaced throughout a considerable portion of the shaft in the rear of the tumbler. Each of said rings is preferably circular and is secured to the shaft in a plane perpendicular thereto by means of guide spokes 22, the relation of which to the rings and shaft is shown in Fig. 3 especially. The series of rings 21 and spokes 22 form the feeding and guiding mechanisms into two substantially semi-cylindrical runways 23 to or along which the potatoes are fed by virtue of the rotation of the feeder and the inclination thereof.

The means for removing the peelings from the potatoes consists of a stripping mechanism shown as comprising a plurality of strippers 24 located preferably on opposite sides of and parallel to the shaft 14. Each stripper comprises a shaft 25 and is supported at its ends in bearings in the casing, and each of said shafts carries a series of sets of stripper arms 26. Each set of arms 26 is so arranged in a plane perpendicular to the shaft to which they are connected as to operate between a pair of rings 21 of the feeding mechanism, such arms being rotated at a higher speed than the feeder. The stripper shafts are shown as being driven from the main shaft 14 by means of large gears 27 connected to the main shaft and meshing with pairs of pinions 28 of the respective strippers or countershafts.

Each stripper arm 26 is firmly connected to a shaft 25, but is preferably of a flexible nature so that it may bend under its work, as indicated in Fig. 3. Each arm, furthermore, is provided with a series of fingers 29 each having one or more claws 30 for immediate contact with the work. These fingers also are flexible and preferably more flexible than the arms 26. By reason of this fact the peelings stripped from the potatoes are more certain of being dislodged from the stripper elements.

With the mechanism constructed and arranged as set forth, the operation of the machine may be briefly described as follows: The potatoes delivered to the hopper 19 pass freely into the tumbler 17 except as controlled by said tumbler. The tumbler serves to distribute the potatoes singly into the several runways 23 along which they roll while being operated upon by the several sets of stripper arms which are caused to sweep around between the several pairs of rings 21, as set forth especially in Fig. 3. The fingers of each arm, as they come into contact with a potato, will strip therefrom the skin thereby engaged, and during the progress of the potato it is rotated around the axis of the shaft 14 into the path of the stripper arms and the fingers on the opposite side of the machine. In other words, the potatoes in the several runways are caused to be acted upon by the several strippers in succession as they progress from the front toward the rear of the machine and are delivered, stripped of their skins, but in a substantially undamaged condition, into the delivery chute 31 adjacent the rear end of the casing. The peelings are tossed toward the sides 32 of the casing and are deposited upon the bottoms thereof or they may be disposed of in any other suitable manner.

As shown in the drawings, I preferably provide a brush 33 adjacent each of the strippers 24 and journal the same upon a countershaft 34 mounted in any suitable bearings in the casing 10. The brush may be made of any suitable material and the free ends of the bristles thereof are adapted to sweep across the path of the fingers 29, whereby the brush will cause any peelings which may tend to adhere to such fingers to be dislodged therefrom. The brush may be operated by any suitable means and in any suitable direction or at any suitable speed, but I show as one means for accomplishing this result a pair of gears 35 and 36 connected respectively to the shafts 25 and 34 and meshing with each other, the gears being so sized as to cause the surface velocity to be at least a little greater than the speed of the fingers. The peelings therefore will be swept from the prongs 30 in a direction substantially tangential to the brush and thrown into a pan 37 or some such receptacle located adjacent the bottom of the casing. The receptacles may be removed from the casing for removal of the peelings or cleansing through any suitable openings or doors 38 provided for the purpose.

Having thus described my invention, I claim as new and desire to secure by Letters Patent:—

1. In a vegetable peeler, the combination of a rotary feeding device, stripping mechanism coöperating with said feeding device, said stripping mechanism including a series of flexible arms adapted to coöperate with the vegetables and each carrying one or more laterally projecting cutting claws adapted to catch the peelings and jerk the same from the vegetables, and means to operate the feeding device and stripping mechanism simultaneously, substantially as set forth.

2. In a device of the character set forth, the combination of an inclined main shaft, feeding devices connected to said shaft comprising a series of spaced rings, stripping mechanism comprising a series of arms adapted to extend between adjacent pairs of said rings, said arms carrying flexible fingers, and means to rotate said shaft and stripping mechanism simultaneously.

3. In a potato peeler the combination of a feeding mechanism including a series of spaced rings and a tumbler adjacent one end of said series, means to deliver potatoes into and through the tumbler, stripping mechanism located at one side and parallel to the feeding mechanism and comprising a series of arms adapted to project between adjacent rings for contact with the potatoes as they progress through the feeder, and means to simultaneously rotate the feeder and said stripping mechanism at different speeds.

4. In a potato peeler, the combination of a feeding mechanism including a tumbler and a series of rings beyond the tumbler, each ring being held in place and operated by means of spokes, said spokes forming the feeder into a plurality of runways into which the potatoes are delivered by the tumbler, stripping mechanism associated with and parallel to the feeder and including a plurality of arms carrying flexible fingers which are adapted to be extended into contact with the potatoes as they progress along said runways, and means to operate the feeding mechanism and stripping mechanism simultaneously.

5. In a potato peeler, the combination of a main shaft, a tumbler connected to the shaft, a series of spaced rings connected to the shaft in the rear of said tumbler, a countershaft parallel to the main shaft, means connected to said shafts for simultaneous rotation in opposite directions, and a plurality of stripper arms arranged in sets, each set adapted to project between a pair of said rings and each arm including a series of flexible fingers having claws for coöperation with the potatoes passing along said rings.

6. In a potato peeler, the combination of a main inclined shaft, a feeder tumbler mounted concentrically upon said shaft, said tumbler being of frusto-conical form, the effective bottom of which is less inclined than the shaft aforesaid, guiding means carried by the shaft beyond the tumbler and adapted to receive potatoes, and stripping mechanism coöperating with said guiding mechanism, substantially as set forth.

7. The herein described vegetable peeler comprising, in combination, feeding mechanism for receiving and delivering the vegetables, a stripper coöperating with the feeding mechanism and including a plurality of stripper arms each having fingers terminating in one or more laterally projecting cutting claws to engage and remove the peelings.

In testimony whereof I have signed my name to this specification in the presence of two subscribing witnesses.

HENRY TRUST.

Witnesses:
MARTIN KRATT,
ALOYS ZIMMERMANN.